May 14, 1963 ANNETTE LEVY NEE AMSELLE 3,089,244
METHOD AND MEANS FOR THE PHOTOGRAPHIC EXAMINATION
OF THE OUTLINE AND SHAPE OF A BODY
Filed Oct. 14, 1957 3 Sheets-Sheet 1

INVENTOR
ANNETTE LEVY, née AMSELLE
BY
ATTORNEY

INVENTOR
ANNETTE LEVY, née AMSELLE 3,089,244
**METHOD AND MEANS FOR THE PHOTOGRAPHIC
EXAMINATION OF THE OUTLINE AND SHAPE
OF A BODY**
Annette Levy, nee Amselle, Ibsen 33.902 Polanco,
   Mexico City, Mexico
Filed Oct. 14, 1957, Ser. No. 690,029
        1 Claim. (Cl. 33—2)

The methods presently used for examining photographically the sizes and attitudes of the human body, more particularly with a view to taking measures for clothes required hitherto very intricate apparatus for their execution, such apparatus being very expensive and their operation and adjustment being an intricate matter. The arrangements provided to this end are also very bulky.

My invention has for its object a photographic method for examining the outline and shape of any body or article, said method being more particularly applicable to the examination of a person for whom clothes are to be made. The execution of said method requires only a simple arrangement which may be readily obtained and which is consequently much less expensive.

Said method consists in producing on a single light-sensitive area a number of pictures or outlines of said article taken almost simultaneously under the same conditions of perspective or under the same angle and comparable with those of simultaneously photographed standards, the composite picture being subsequently projected. This method is executed, more particularly for tailoring purposes in a view-taking chamber wherein a camera adapted to rotate around a vertical axis takes three views in succession of the object or person to be photographed during the rotation of the latter round a vertical axis, the views being taken on successive thirds of a film area, while a black curtain limits the field of the objective; articles of a known size are photographed with said object and also a cross-ruling or orthogonal lines serving as a reference system, while the shifting of the camera, the release of the shutter and the illumination are controlled synchronously with the rotation of the object to be photographed. On the other hand, the picture obtained is projected in a projecting room onto the rear surface of a ground glass at a scale given out by the reference articles so that the latter and the cross-ruling provide the desired measurements; the negative allows studying the outlines and a positive print allows studying the shapes.

The features of my invention will appear more clearly in the reading of the following description of an arrangement for the execution of my improved method and applicable more particularly to the tailoring of clothes, reference being made to the accompanying drawings wherein.

Figure 1:
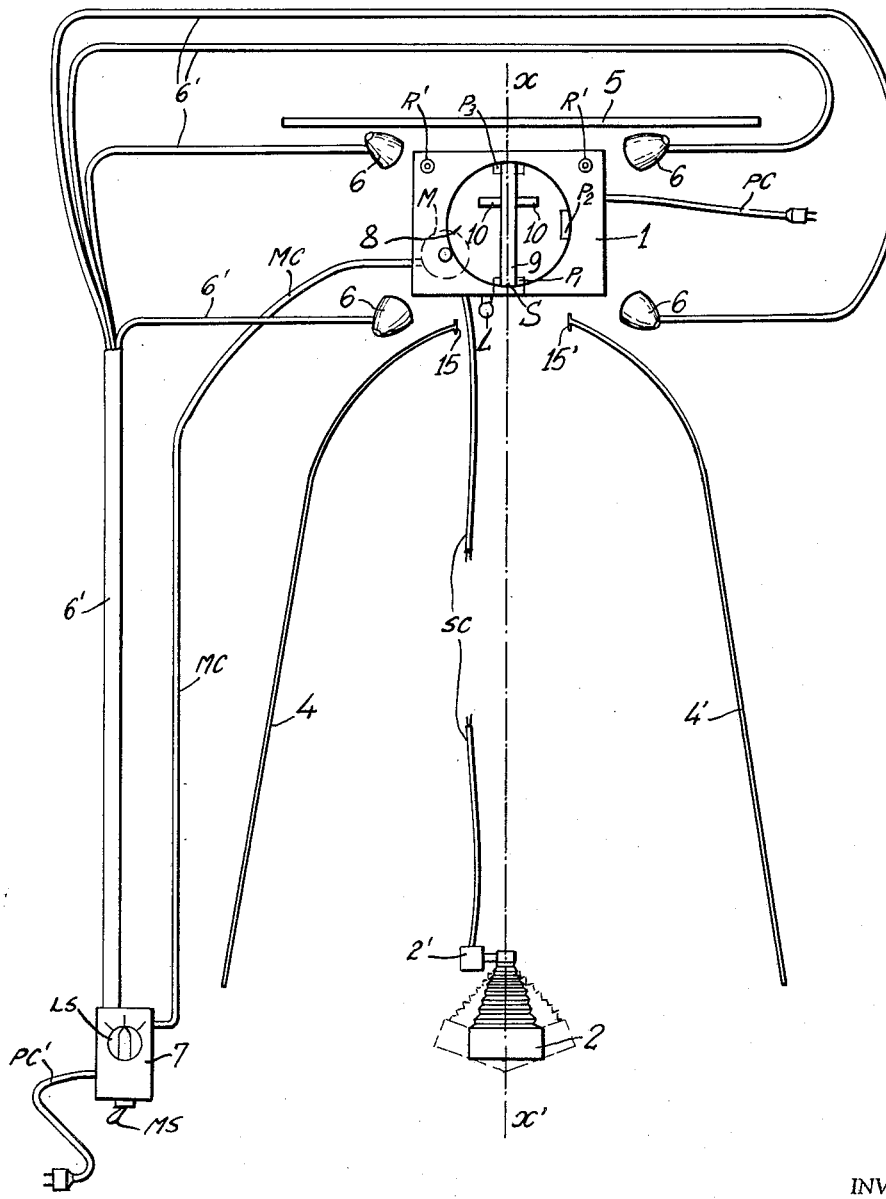
FIG. 1 is a diagrammatic showing of a photographic view-taking arrangement.
Figure 2:
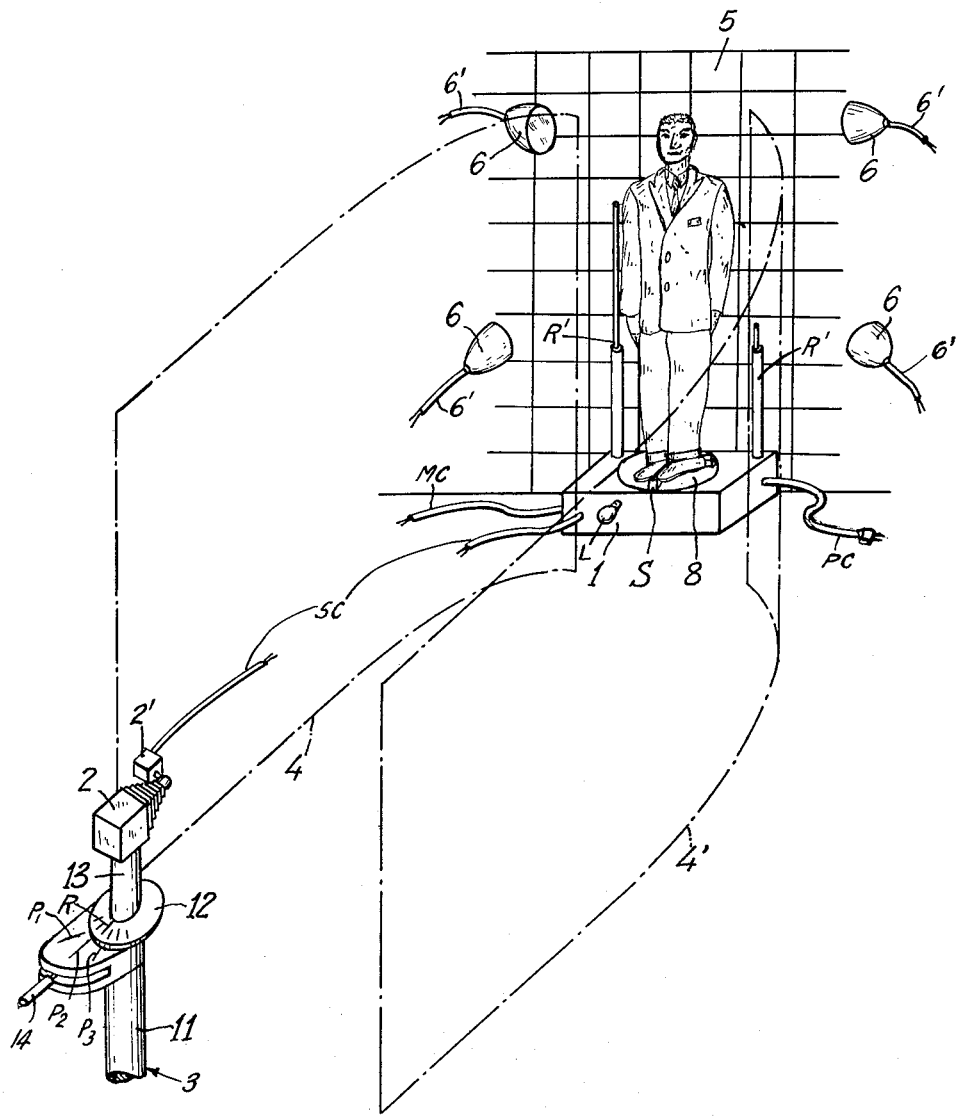
FIG. 2 is a perspective view of said arrangement, the black curtain being assumed to be transparent for the purposes of the disclosure, so as to allow a proper showing of the different parts.
Figure 3:
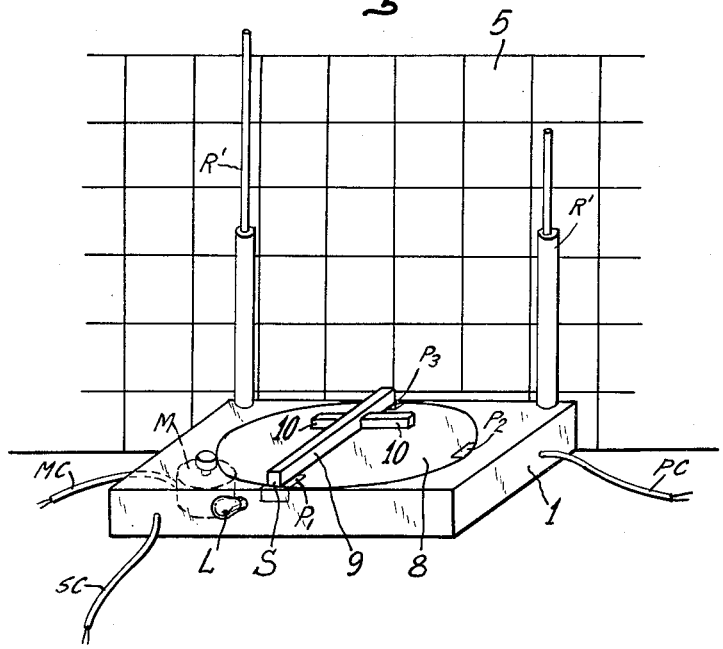
FIG. 3 shows the cross-ruled white board forming a background and serving as a reference or scale for the measurements, said board being fitted behind the support on which the object, say the person to be clothed, is positioned.

As shown diagrammatically, the view-taking premises which are more particularly intended for the application of my method to the execution of clothes include inside a room, which is rectangular for instance, a platform 1 for the object or person to be photographed, said platform being located at one end of the room, a camera 2 at the other end of the room on a stand 3, a black curtain including two sections 4 and 4' defining the field of the objective, a white background panel 5 carrying a cross-ruling of orthogonal lines, illuminating means 6 and a control unit 7 for said illuminating means, and for the means providing for a rotation of the object or person to be photographed around a vertical axis. The control unit 7 has a power cable PC', a lamp switch LS and a motor switch MS.

The platform 1 for said object or person includes a rotary horizontal element 8 fitted in the stationary section of the platform 1 and adapted to be driven around its vertical axis by a small motor M. To said element 8 are secured a thin wooden bar 9 extending diametrically of said element and to either side of said bar, two wedges 10 adapted to hold the object or the person in position on the rotary element 8.

The white reference board 5 carries ruled lines which are suitably spaced both horizontally and vertically.

On the stationary section of the platform 1 articles of a predetermined size are arranged as reference members together with adjustable uprights R', which are more particularly intended for defining for instance the height of the arm pits, of the fork and the like.

Figure 4:
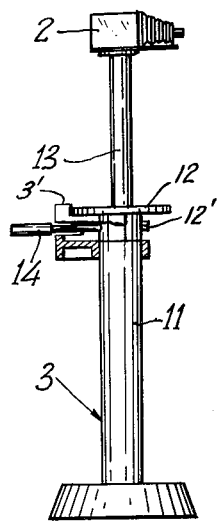
FIG. 4 illustrates diagrammatically a stand carrying the camera.

The actual camera (FIGS. 1 and 4) includes a shutter which is preferably released electrically through an arrangement such for instance as a solenoid 2' which is energized at the desired moment.

The solid camera stand 3 is secured to the floor and includes a heavy lower end (FIG. 4), a stationary vertical socket 11 slidably and revolubly carrying the rod 13 rigid with an upper platform 12 arranged horizontally and coaxial with the socket, so as to be thus movable vertically and around its axis. A screw 12' clamps in the desired vertical location said rod 13 carrying the platform 12 inside the socket 11 while a handle 14 controls the rotation of said rod; a reference mark R on the platform 12 moves in front of a stationary scale 3' rigid with the stand 3. The camera is secured to the rod 13 through wedges and supporting screws, not shown.

The curtains 4 and 4' are black and thick and prevent the passage of the light beams and frame the object or the person to be photographed just beyond them. They are suspended as usual by rings to a horizontal rod so as to be adapted to register with the entire field of the camera. Weights are also provided so as to stretch said curtains and to make their cooperating edges 15 and 15' perfectly vertical.

The illuminating means 6 (FIG. 1) include four photoflood or the like lamps arranged around the person or object to be photographed beyond the curtains 4 and 4'. They are preferably mounted in parallel series so as to allow various adjustments to wit, a reduced illumination in series connection and a violent illumination in parallel connection to be used only during the actual photographing.

Within reach of the operator, the control means 7 provide through electric means for the rotation of the platform element 8 and the parallel or series ignition of the illuminating lamps 6.

The operation of the view-taking means described is as follows:

The preferred angular settings of the object to be photographed (the word "object" covering as well in the present description and claims a person to be photographed) being chosen as constituted by the back, side and front views, the points of passage of the object corresponding to each of these angular settings through the axis x—x' of the objective are defined by the registering of copper contact-pieces P1, P2 and P3 on the rotary platform element 8 with the contact point S of the cooperating stationary platform 1, said registering providing for the release of the shutter through a closing of the cable circuit SC over the solenoid actuating it while a lamp L may serve for observing the operation of the system. A power cable PC supplies current to the turntable contacts and shutter solenoid 2'.

The curtains are stretched and the camera 2 is positioned at the desired level passing, for instance, substantially through the middle of the chest of the person to be photographed, whose feet rest on the rotary platform 8 in contact with the wedges 10.

The optimum illumination is obtained through suitable adjustment while the diaphragm opening and the speed of the shutter are also adjusted, said shutter being comparatively high (1/50 or 1/100 of a second) so as to take into account the rotation of the object.

This being done and the shutter remaining open, there are defined on the ground glass of the camera finder three equal parallel and vertical areas numbered 1, 2 and 3; the distance between the camera and the object should be such that the picture limited by the curtains is formed in the central area 2, the camera being normally directed along the axis $x$—$x'$, the focusing being performed through a magnifying glass. The position $p2$ of the mark R is registered on the scale rigid with the camera stand; slight angular shiftings of the camera will then bring the picture onto the areas 1 and 3 and the corresponding positions $p1$ and $p2$ are registered on the scale. To each position of the camera defined by the scale subdivisions $p$, $p2$, $p3$ there corresponds a position of the rotary platform defined by the passage at S of P1, P2 and P3.

The automatic release of the shutter is provided each time one of said contact-pieces P1, P2, P3 reaches the cooperating contact-piece S, the operator modifying each time the angular setting of the camera by bringing the reference mark R into the corresponding position $p1$, $p2$, $p3$ respectively. It is of advantage to ensure an automatic synchronism of the movements of the camera and of the platform.

The projection room is designed so as to allow a fitting of the developed negative between two sheets of glass with a view to projecting it onto the rear surface of a ground glass. The scale of enlargements is provided by the articles of predetermined sizes photographed with the object.

It is also of advantage to photograph under the same conditions and in the same position as the object a cross-ruled screen of similar proportions and the negative obtained is projected at the same scale onto the ground glass, so as to be reproduced permanently thereon in the shape of fine threads or wires; the superposition of said cross-ruled reproduction with the articles of a known size and with the background cross-ruling allows obtaining all the desired measurements. The examination of the outlines may be made on the negative, but it is necessary to print a positive for the examination of the shapes.

My improved method shows numerous advantages since it allows taking a number of pictures or outlines of any object within a very short time, of the order of a few seconds, under the same view-taking angle on a single photosensitive surface and it is possible to compare the pictures of different objects with one another or with standard articles photographed with them.

The execution of my method is extremely simple and requires only an easily controlled arrangement of a small bulk and of a very low cost-price when compared with the arrangements required for the execution of the methods now in use. It provides sufficiently accurate and complete information for obtaining the desired measurements and for being acquainted with the postures of the human body.

Lastly, the method is applicable to various other fields as will be readily ascertained. It is also possible to increase the number of views under normal illumination and also under electronic synchronous flash-light illumination; the rotation of the camera in a horizontal plane may also be associated with a vertical shifting and certain views may be superposed partly or entirely so as to further the desired comparison.

What I claim is:

An equipment for defining the outlines and the shapes of an object through a mere visible comparison of photographs of the object taken simultaneously with reference articles, comprising in combination a turntable adapted to carry the object and electric motor means adapted to rotate the turntable around a vertical axis, a support adapted to carry stationary reference articles, a stationary cross-ruled background, a vertically adjustable stand carrying a camera provided with a shutter and a photosensitive surface permitting the taking successively of at least three photographs and adapted to rotate around a vertical axis, two opaque curtains positioned between the turntable and the camera to either side of the line joining same to limit the field of view, means for electrically operating the camera shutter, means for rotating the camera stand and the turntable respectively around their respective vertical axes to provide for the photographing on juxtaposed areas of the photosensitive surface of the subject on the turntable for successive angular positions of the latter, adjustable illuminating means for the object and reference articles, means for automatically producing the operation of the camera shutter operating means in response to the movement of the turntable while permitting corresponding angular positions of the camera to be made about its vertical axis to take the successive photographs upon the photosensitive surface, and control means for the electric motor and illuminating means in close proximity to the camera stand.

References Cited in the file of this patent
UNITED STATES PATENTS

| | | |
|---|---|---|
| 647,608 | Pietzner | Apr. 17, 1900 |
| 1,454,001 | Smithers | May 1, 1923 |
| 1,937,433 | Moe | Nov. 28, 1933 |
| 2,140,602 | Simjian | Dec. 20, 1938 |
| 2,163,124 | Jeffreys | June 20, 1939 |
| 2,563,451 | Booth | Aug. 7, 1951 |
| 2,631,374 | Purdy | Mar. 17, 1953 |
| 2,664,784 | Waller | Jan. 5, 1954 |
| 2,809,571 | Christensen | Oct. 15, 1957 |
| 2,871,759 | Sconce | Feb. 3, 1959 |

OTHER REFERENCES

Literary Digest, page 588, March 26, 1910.